Oct. 18, 1966     W. E. ARNOLD, JR     3,279,746

BOTTOM SEATING DRIP-PROOF VALVES

Filed May 1, 1963     2 Sheets-Sheet 1

INVENTOR.
WALTER E. ARNOLD, JR.

BY

*Fay & Fay*

ATTORNEYS

Oct. 18, 1966    W. E. ARNOLD, JR    3,279,746
BOTTOM SEATING DRIP-PROOF VALVES
Filed May 1, 1963                                           2 Sheets-Sheet 2
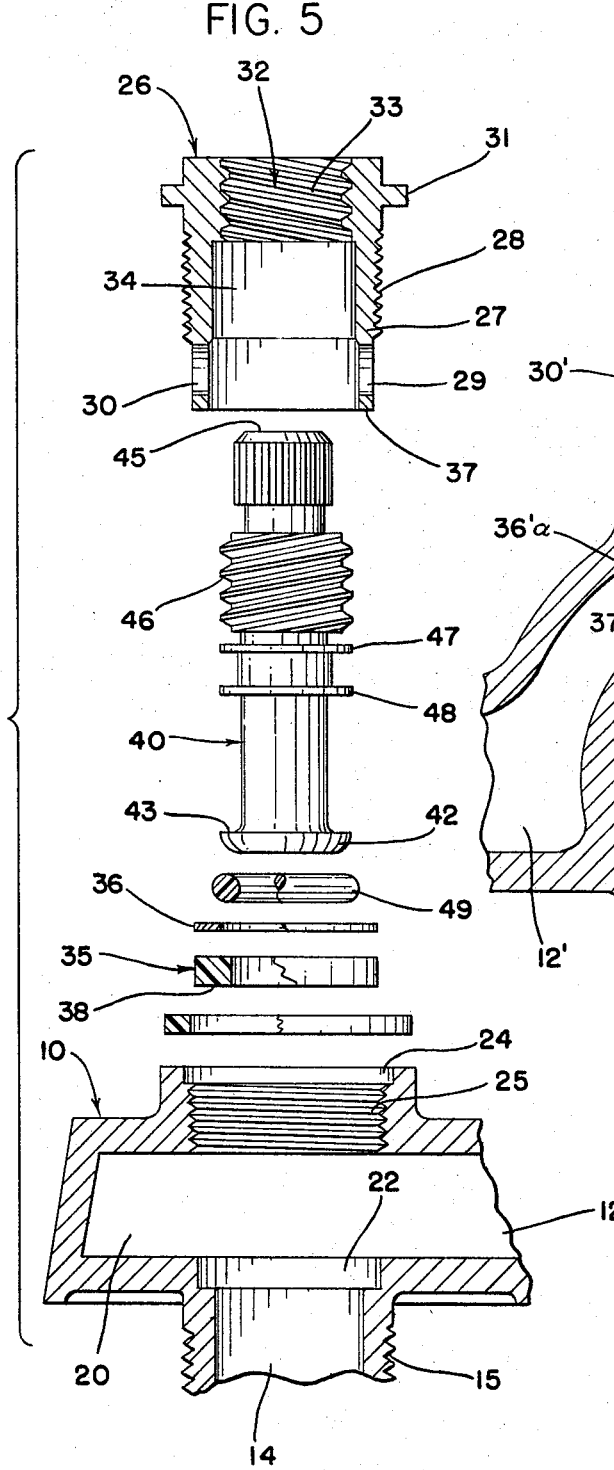
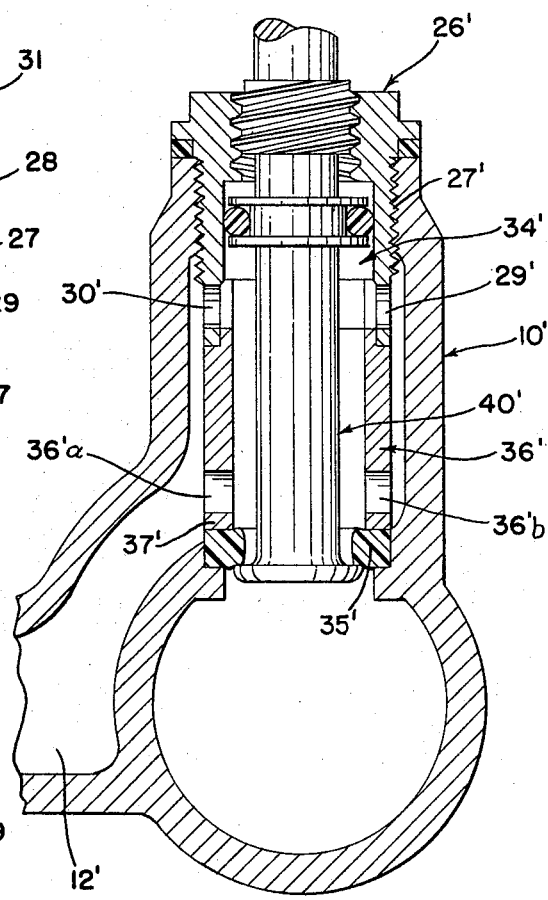
INVENTOR.
WALTER E. ARNOLD, JR.
BY
*Fay & Fay*
ATTORNEYS ically shaped seals or intricately machined seats as has been required in construction of the prior art valves of this general type.
United States Patent Office 3,279,746
Patented Oct. 18, 1966

3,279,746
BOTTOM SEATING DRIP-PROOF VALVES
Walter E. Arnold, Jr., Cleveland, Ohio, assignor to Wal-Rich Brass Mfg. Co., Parma, Ohio, a corporation of Ohio
Filed May 1, 1963, Ser. No. 277,366
7 Claims. (Cl. 251—214)

This invention concerns a bottom seating faucet or valve assembly which minimizes leaks, provides for ease of replacement of seals, is adaptable to many faucet or valve applications, and which is inexpensive to manufacture.

In its broadest sense, the bottom seating faucet assembly of this invention comprises a housing having an outlet and a counterbored inlet in communication with each other. An opening is provided on the housing opposite the inlet and an elongated hollow cap is removably secured within the opening with an end thereof adjacent the counterbore of the inlet. A resilient annular seal is compressed between an annular surface located at the end of the cap and the inlet counterbore such that in its assembled position, the internal diameter of the seal is less than the internal diameter of the annular surface.

An elongated valve core is mounted and sealed for selective axial movement within the hollow cap with an end of the core projecting into the inlet. A flange of a diameter less than the internal diameter of the annular surface and greater than the internal diameter of the resilient annular seal under compression is provided on the core end within the inlet such that the flange can pass through the resilient seal for replacement of the seal when the cap is removed from the housing. The flange and seal are provided with relative dimensions, however, which prevent the flange from passing through the seal when the cap is secured in the housing in assembled position with the seal under compression.

Accordingly, a faucet is provided in which a bottom seating flange on a core member and an annular resilient seal alternately are moved out of and into engagement respectively to open and close the faucet in response to the selective axial movement of the core relative to the hollow cap. The design insures that when the faucet is in service with its inlet connected to a fluid source, the fluid pressure in the inlet normally urges the core flange against the annular resilient seal to maintain the faucet in closed leak-tight position.

The advantages of the faucet constructed according to the principles of this invention include the minimization of leaks because of the normally closed condition of the valve caused by the inlet pressure acting against the large exposed area of the rigid core flange with a relatively small area of the resilient annular seal being exposed to the inlet pressure. In this manner, little or no deformation of the resilient seal out of its seat in the inlet counterbore can occur. This advantage is provided in an inexpensive manner using easily manufactured parts capable of being produced by simple machining operations, since the design does not require unconventionally shaped seals or intricately machined seats as has been required in construction of the prior art valves of this general type.

An extremely important aspect of this invention is the combination of features of design which permit ease of inspection and replacement of the resilient annular seal, it being a characteristic of the design that the removal of the hollow cap from the housing provides complete free and open access to the primary annular resilient seal for full inspection of the seal condition without further disassembly of the component parts being necessary. Upon determination of the need for replacement of the annular resilient seal by the simple operation of removing the cap from the housing, the particular dimensional relationship of the annular resilient seal and the core flange permit the annular seal, when in its free state on the core and out of its seat in the inlet counterbore, to be slipped over the core flange for replacement by a new seal. It should be noted in this respect that, because of its resilient nature, the annular seal when under compression in assembled position in the faucet is distended radially inwardly and axially; but that upon disassembly the washer assumes its free state with its inner diameter somewhat larger to enable it to be removed with only slight stretching thereof to remove it over the flange on the core end.

In a similar manner, the annular surface which backs the annular resilient seal has an internal diameter just slightly larger than the diameter of the flange such that the flange may be passed therethrough and removed from the bottom of the hollow cap by a simple threading operation after the cap and assembly core has been removed from the housing. It is important, furthermore, that the inner diameter of the backup surface remains large enough to supply sufficient support for holding the primary or annular resilient seal under compression and to prevent the flange which seats against the resilient annular seal from passing through the central aperture of the compressed annular seal during closing of the valve.

Other provisions on the valve for insuring that leaks will be minimized or eliminated are the provision of a second seal within the hollow cap and above the assembly for preventing leakage between the core and hollow cap and external annular gaskets for preventing leakage between the hollow cap and the housing. Accordingly, the entire arrangement is seen to comprise an extremely efficient and leak-tight bottom seating valve which is specifically designed to provide ease of inspection and replacement of the seal while providing an inexpensive faucet to manufacture comprising simple parts which can be produced by conventional methods without resorting to complicated seal shapes or intricate seat machining operations.

Accordingly, it is the general object to provide an improved bottom seating faucet assembly which minimizes leakage and provides for extreme ease of inspection and replacement of the primary seal.

It is an additional object of the invention to provide a valve which is easily closed in the direction of flow through the valve.

It is a further object of the invention to provide a bottom seating faucet which is inexpensive to make from standard component parts without intricate machining operations.

It is a still further object of the invention to provide a versatile design for a bottom seating faucet which may be used in connection with many faucet body sizes and shapes.

An additional object of the invention is to provide a bottom seating faucet assembly which has a normally closed leak-tight condition provided by a long wearing resilient seal element.

Other and more specific objects of the invention will be apparent from the detail of the description to follow.

In the drawings like parts are designated by like numerals throughout the several views.

FIG. 5 is an exploded elevational view of the faucet illustrated in FIGS. 1 to 4.

FIG. 6 is a fragmentary cross-sectional elevational view of an alternative embodiment of a faucet constructed according to the principles of this invention.

Figure 1:
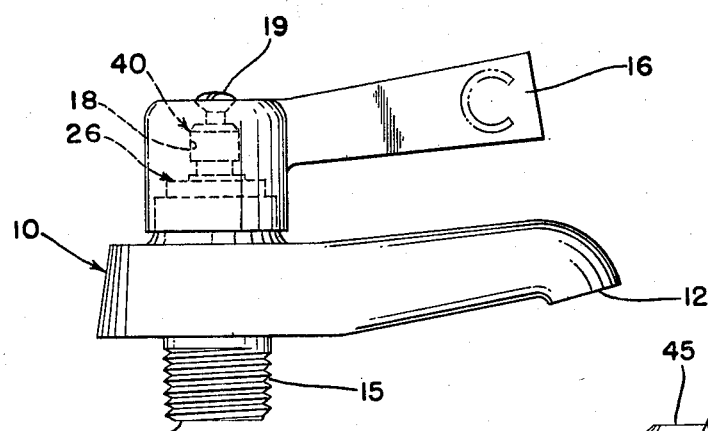
FIG. 1 illustrates an elevational view of a faucet constructed according to the principles of this invention.
Figure 2:
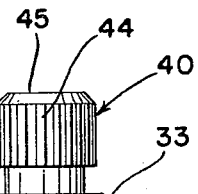
FIG. 2 is a fragmentary cross-sectional elevational view of the faucet of FIG. 1 in the closed condition.
Figure 3:
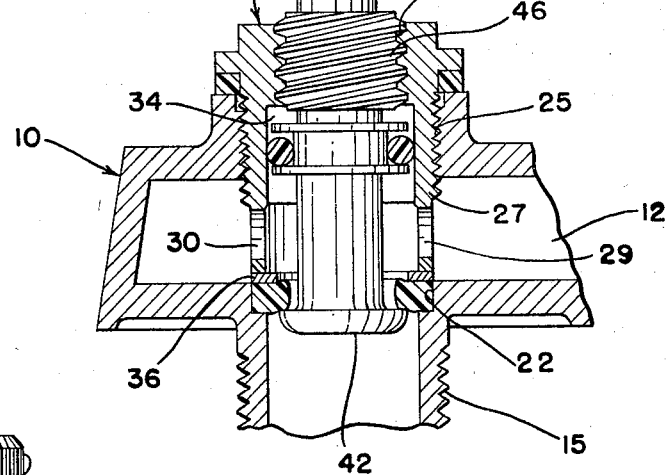
FIG. 3 is a view similar to FIG. 2 with the faucet in open condition.
Figure 4:
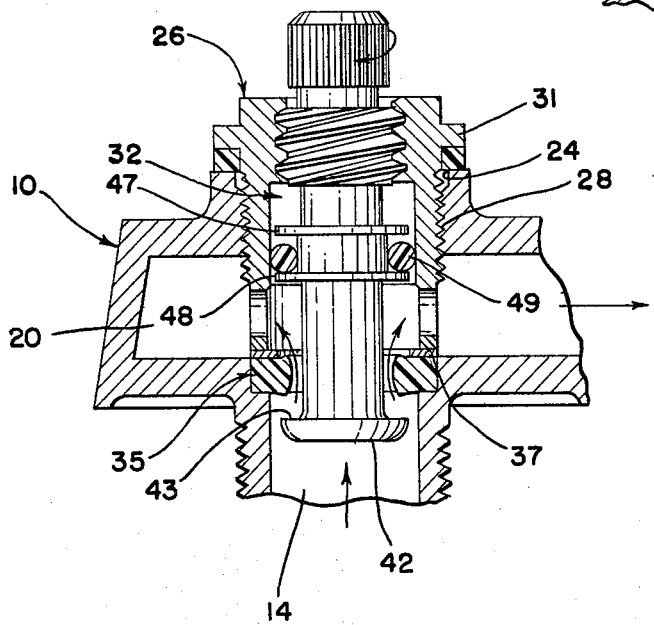
FIG. 4 is a fragmentary detailed view of the elements comprising the primary seal of the faucet illustrated in FIGS. 1 to 3.

In FIG. 1 the external construction of an embodiment of the faucet is shown which includes a housing 10, an outlet 12, and an inlet 14. The faucet is shown fully assembled and ready to be threadedly associated by means of external threads 15 on the inlet portion 14 to the end of an internally threaded fluid source, such as a hot or cold water pipe connection in a sink or wash basin. An appropriately designed handle 16 is provided for changing the open or closed condition of the faucet.

The bottom seating faucet housing 10 in the embodiment illustrated defines an internal chamber 20 which is in communication with the outlet 12 and the inlet 14. The inlet 14 has a counterbored portion 22 adjacent the chamber 20 on one side thereof. On the opposite side of the chamber 20, coaxially oriented with respect to the inlet 14, is an opening 24 having internal threads 25.

A hollow cap member 26 having an elongated skirt portion 27 with external threads 28 intermediate the ends thereof is mounted in opening 24 with threads 28 in co-operation with the threads 25. The hollow cap 26 has lateral apertures 29 and 30 and is dimensioned so that when the cap is threadedly assembled into the opening 24 against a radial flange 31 on the cap exterior; the skirt portion 27 of the hollow cap projects substantially across the chamber 20 of the housing 10 with apertures 29 and 30 within chamber 20.

The internal hollow portion or opening through the cap 26 is an axially extending passageway 32 which is communicated with the chamber through the apertures 29 and 30. A threaded portion 33 having heavy acme or other suitable threads is provided in the end of the passageway 32 remote from the inlet. The remainder of said passageway is defined by a smooth cylindrical seat portion 34 located intermediate the threaded portion 33 and the apertures 29 and 30.

The counterbore 22 of the inlet 14 has disposed therein an annular resilient seal or washerlike member 35 which has a smaller internal diameter than the inlet and which is complementarily shaped to fill the counterbore 22 and project radially inwardly therefrom. The annular resilient seal 35 is held in place within the counterbore 22 by means of either an annular backup member 36 or an annular backup surface 37 at the end of the cap skirt portion 27 having an internal diameter greater than that of the annular resilient seal. The backup member 36, when used is located on the side of the annular resilient seal adjacent the chamber 20 and abuts the inner end 37 of the cap skirt portion 27 when the hollow cap 26 is threadedly associated in the opening 24 with flange 31 of the cap in finally assembled position.

The parts are relatively dimensioned such that the annular resilient seal 35 is held under compression out of the free state and is slightly deformed radially inwardly toward the axis of the inlet for co-operation with the end of an elongated valve core or stem 40 which extends through the hollow cap 26 and into inlet 14 and includes a filleted flange 42 having an inner annular overface 43 thereon to mate in face to face engagement with the axial surface of the resilient annular seal 35 adjacent inlet 14.

It is the coaction of the compressed resilient seal 35 and the surface 43 which provides the positive bottom closing action of the faucet and insures a leak-tight no-drip condition when the faucet handle 16 is turned to the off position. These results are effected because the annular resilient seal 35 is somewhat stiffened in the compressed area, and accordingly has increased resistance against tearing or fatiguing under long use in that portion engaging the counterbore 22 and backup member 36 or backup surface 37 while the radially inwardly projecting portion which engages the flange 42 is still resilient enough to make a good leak-tight seal.

The handle 16 acts to close the faucet by means of a splined opening 18 therein and a co-operatively splined portion 44 adjacent the end 45 of the core 40 opposite the flange 42. A suitable fastener such as screw 19 is secured in a tapped hole in the core end 45 to maintain the faucet handle 16 in position, as will be readily understood from a knowledge of conventional faucet assemblies.

The elongated core 40 has external acme or other suitable threads 46 located adjacent splined portion 44 for co-operation with internal threads 33 in the passageway 32 of cap 27 in such a manner that rotation of core 40 by selective manual manipulation of the handle 16 creates an axial movement of the core 40 and a corresponding movement of the flange surface 43 into and out of engagement with the annular seal 35 to open and close the faucet.

The large area of the flange 42 facing the inward flow of fluid through inlet 14 acts on said flange in a manner which produces an assisting force in the axial closing direction of movement such that an extremely soft leak-tight closing action is accomplished. Moreover, during opening of the faucet, the surface 43 upon being initially moved out of contact with seal 35 receives a balancing component of force from the pressure of fluid behind it in the opposite axial direction to assist in overcoming the normally acting force urging the flange 42 closed.

The remainder of the structure is maintained leak-tight by means of a seal intermediate the threaded portion 46 and the flange 42 on the core or stem 40 in a position which remains in radial alignment with the cylindrical seat portion 34 of passageway 32 during axial movement of said core to open and closed positions.

A pair of axially spaced flanges, 47 and 48, respectively of an external diameter slightly less than that of seat portion 34, define with the shank of the core or stem 40 lying therebetween, a groove for an O-ring 49 which co-operates with seat portion 34 to prevent leakage between the core 40 and the cap 26 through co-operating threads 33 and 46. The O-ring seal 49 is an annular member under tension and may be stretched sufficiently to be assembled over flanges 48 and 42.

The uppermost surface of the flange 47 is located on the shank of the core or stem 40 such that it will contact the shoulder between threads 33 and cylindrical seat portion 34 when the valve is in the fully closed position thus providing a positive stop when the stem is raised to closed position to eliminate excessive strain on the resilient seal 35.

A further provision against leaks is provided in the form of conventional gaskets between the flange 31 of the hollow cap 26 and the outer periphery of the housing 10 with which it mates when assembled in face to face engagement with all components properly assembled.

It should be noted that in addition to acting as a stop for limiting the axial movement of the hollow cap 26 and skirt 27 into seal compressing position in opening 32, the cap flange 32 may be provided with appropriate tool pads to facilitate assembly and disassembly of the faucet.

Perhaps the most demanding mechanism in domestic households, from the standpoint of maintenance requirements, are the numerous faucets found in conventional plumbing systems. The faucet of this invention has been specifically designed to minimize the necessity of repairs and to permit the average homeowner to easily inspect and repair a faucet when it is found necessary.

Accordingly, upon noting a defect in operation of the faucet of this invention, a simple inspection may be effected by applying torque to tool pads on the flange 31 and unthreading and removing the hollow cap 26 and core 40 from the housing 10. This operation removes the annular resilient seal 35 from its seat by the force of the surface 43 thereon such that both seal 35 and backup member 36 are removed with the cap and core assembly to afford open inspection of their conditions. The condition of the O-ring seal 49 may then also be observed by simply unthreading the cap 26 from the core 40.

If it is found that the annular resilient seal 35 is in need of replacement, it may be removed and replaced by stretching the seal out of its free state slightly to pass it over the flange 42. The backup member may be removed over flange 42 easily if it has become adhered to the seal 35 or otherwise damaged since its inside diameter is slightly larger than the outside diameter of flange 42.

The ease of replacement of the bottom seating seal 35 is possible only because of the relative dimensions, and the resilient nature of the material from which it is made. The use of this material in a bottom seating installation is satisfactory only where adequately supported under compression according to the principles of this invention.

In addition to removal and replacement of the primary annular resilient seal 35, the O-ring seal 49 may similarly be removed and replaced by stretching and slipping over the flanges 48 and 42 while the stem 40 is disassembled from the cap 26 and the seal 35 and backup member 26 are off.

Thus, it will be seen that the novel structure of the invention, whether incorporated into faucets for domestic use or other types of valves for industrial uses in processing and instrumentation systems, will provide complete free and open access to the primary annular resilient seal for full inspection of the seal condition with the simple operation of removal of the hollow cap 26 and core 40 associated therewith from the housing 10. And further, it will be seen that since the primary seal is removed with the core 40 when this operation is performed, the method of replacement is extremely simple and reassembly of the repaired faucets extremely convenient.

A contemplated modification of the primary seal structure of the invention (not shown) for increasing the wear of the annular resilient seal 35 is to provide complementary tapers on the mating surfaces 38 and 43. This provision has been found generally satisfactory for this purpose but has the disadvantage of compromising the position action during opening or closing attainable in the illustrated embodiment, it being noted in this respect that after the illustrated faucet is cracked open with the flange spaced slightly axially away from the annular resilient seal, the pressure from water flowing through the inlet acts against the back of the flange to aid in opening the valve in much the same manner that the large head area of the flange facing the inward flow of water within the inlet 14 helps to provide a soft closing action as the faucet core is rotated in the threads 33 to close the valve.

Another embodiment of a valve constructed according to the principles of this invention is illustrated in FIG. 6 to emphasize the versatility which is afforded by the novel structure disclosed herein. For instance, in the valve of FIG. 6 in which parts corresponding to parts of the embodiment of FIGS. 1–5 are illustrated by the respective numerals primed, the housing is designated 10'; the outlet 12'; etc. It will be noted that the only major changes in the entire structure of this valve in comparison to the earlier described faucet is in the differences in the shapes of housings 10 and 10' and the backup members or spacers 36 and 36' and the lengths of cores 40 and 40'. This enables the standard cap design to be utilized with the apertures 29' and 30' blocked by a reduced diameter portion of member 36' which telescopes into the bore of cap 26' to the shoulder which defines the inner end of seat portion 34'. Apertures 36'a and 36'b are provided in the wall of member 36' to accomplish the function of apertures 29 and 30 of the embodiment of FIGS. 1–5 in the FIG. 6 structure.

It will be further noted that the cap skirt portion 27' can be lengthened and a faucet of substantially the same design as shown in FIG. 6 can be provided with the features of the invention being accomplished by compressive force against seal member 35' being applied by the annular backup surface 37' at the end of the cap skirt portion 27' with elimination of the annular backup member 36', in a manner similar to the provision of the preferred embodiment without annular backup member 36.

For ease of description, the principles of the invention have been set forth in detail in connection with but a single illustrated embodiment. It is not our intention that the drawings nor the terminology employed in describing them be limiting inasmuch as variations in these may be made without departing from the spirit of the invention. Rather, we desire to be restricted only by the scope of the appended claims.

The invention claimed is:
1. A bottom seating faucet assembly comprising:
   a housing having a chamber with an outlet and an internally counterbored inlet in communication therewith,
   an internally threaded opening in said housing intersecting said chamber opposite said inlet,
   a cap in assembled position with respect to said housing with an elongated externally threaded skirt portion projection inwardly across said chamber threadedly engaged in said opening,
   said cap having an axially extending passage therethrough and at least one aperture communicating said passage with said chamber,
   said passage having a threaded portion and an unthreaded cylindrical portion.
   the counterbore of said inlet having a first annular resilient seal of smaller internal diameter than said inlet when mounted therein and held in place by forces exerted thereon from an adjacent annular backup surface located at the inward end of said cap skirt portion,
   said annular backup surface having an internal diameter greater than the internal diameter of said first annular resilient seal,
   an elongated one-piece core means extending through said cap passage with one end projecting outwardly, away from said inlet and one end projecting inwardly into said inlet,
   a threaded portion on said core means threadedly engaged in the threaded portion of said passage,
   a second annular seal means retained on the periphery of said core means in sliding engagement with said cylindrical portion of said passage,
   a seal retaining means on said core means for maintaining said second annular seal means within certain bounds on said core means, said seal retaining means having a diameter greater than the internal diameter of said annular backup surface,
   a flange portion on the end of said core means projecting into said inlet for movement into and out of sealing engagement with the side of said first annular resilient seal opposite said chamber in accordance with the axial movement produced by rotation of the core means relative to the cap means to open and close the faucet,
   said flange means having a diameter greater than the internal diameter of said first annular resilient seal and less than the internal diameter of said annular backup surface,
   whereby said flange can pass through said first annular resilient seal for replacement of said seal upon disassembly of the faucet by relative rotation between the cap and the housing but cannot pass through said first annular resilient seal when said cap is in assembled relation with respect to said housing.

2. The combination of claim 1 in which said annular backup surface is on a member separate from said cap skirt portion.

3. A bottom seating faucet assembly comprising:

a housing having an outlet and a counterbored inlet in communication with each other, an opening in said housing opposite said inlet with an elongated hollow cap removably secured therein with one end adjacent the counterbore of said inlet, a resilient annular seal under compression between an annular surface located at the end of said cap and said inlet counterbore such that the internal diameter of said seal is less than the internal diameter of said surface, a second annular seal means retained on the periphery of said core means in sliding engagement with said cylindrical portion of said passage, a seal retaining means on said core means for maintaining said second annular seal means within certain bounds on said core means, said seal retaining means having a diameter greater than the internal diameter of said annular backup surface.

an elongated one-piece valve core mounted and sealed for selective axial movement within said hollow cap with an end thereof projecting into said inlet, said core end having a flange of a diameter less than said internal diameter of said annular surface and greater than said internal diameter of said resilient annular seal when under compression such that said flange can pass through said seal for replacement of said seal when said cap is removed from said housing but said flange cannot pass through said seal when said cap is secured in said housing, whereby said flange and annular resilient seal alternately are moved out of and into engagement respectively to open and close said faucet in response to the selective axial movement of said core relative to said hollow cap.

4. The faucet of claim 3 in which said core flange has a surface against which fluid pressure in said inlet normally urges said flange against said resilient annular seal to maintain said faucet in closed leak-tight condition with said flange tightly abutting said annular resilient seal radially inward of said inlet counterbore.

5. The combination of claim 4 in which said annular backup surface is on a member separate from said cap skirt portion.

6. The combination of claim 5 in which said annular backup member has apertures communicating said outlet and counterbored inlet.

7. A bottom seating faucet assembly comprising:

a housing having an outlet and a counterbore inlet in communication with each other, an opening of said housing opposite said inlet with an elongated hollow cap removably secured therein with one end adjacent the counterbore of said inlet, a resilient annular seal under compression between an annular surface located at the end of said cap and said inlet counterbore such that the internal diameter of said seal is less than the internal diameter of said surface, a second annular seal means retained on the periphery of said core means in sliding engagement with said cylindrical portion of said passage, a seal retaining means on said core means for maintaining said second annular seal means within certain bounds on said core means, said seal retaining means having a diameter greater than the internal diameter of said annular backup surface, an elongated one-piece valve core mounted and sealed for selective axial movement within said hollow cap with an end thereof projecting into said inlet and through said internal diameter of said seal, said core end having a flange of a diameter greater than the internal diameter of said resilient annular seal in both the free state and the compressed state such that said flange can pass through said seal for replacement of said seal when said cap is removed from said housing only when said resilient annular seal is stretched out of the free state, but said flange cannot pass through said seal when said cap is secured in said housing or in said free state whereby said flange and annular resilient seal alternately are moved out of and into engagement respectively to open and close said faucet in response to the selective axial movement of said core relative to said hollow cap.

References Cited by the Examiner
UNITED STATES PATENTS

| | | | |
|---|---|---|---|
| 1,739,864 | 12/1929 | Schardein | 251—221 X |
| 2,478,350 | 8/1949 | Wirz | 251—214 |
| 2,786,645 | 3/1957 | Ralston | 251—333 |
| 2,872,221 | 2/1959 | Burns et al. | 251—214 X |

WILLIAM F. O'DEA, *Primary Examiner.*

ISADOR WEIL, *Examiner.*

D. MATTHEWS, *Assistant Examiner.*